Feb. 21, 1928.
H. W. BELL
1,660,031
FLEXIBLE CONNECTION
Filed Jan. 30, 1922  3 Sheets-Sheet 1
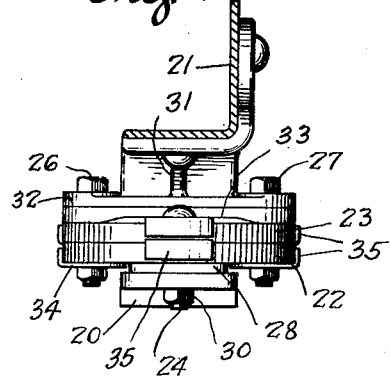
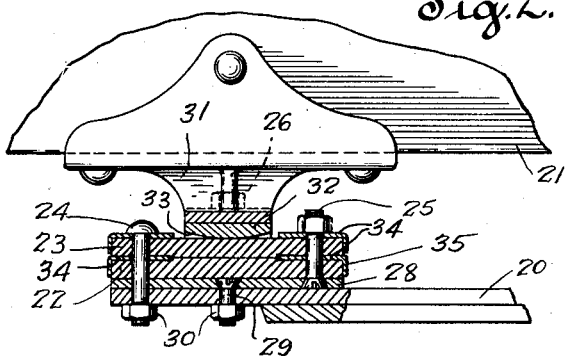
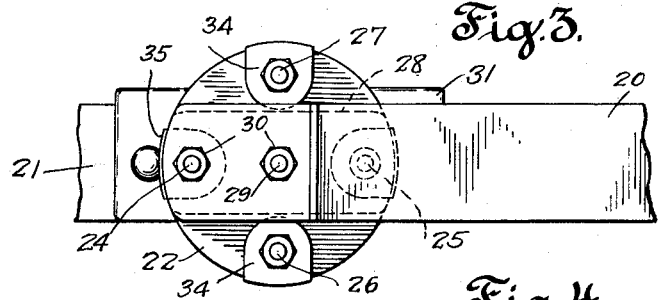
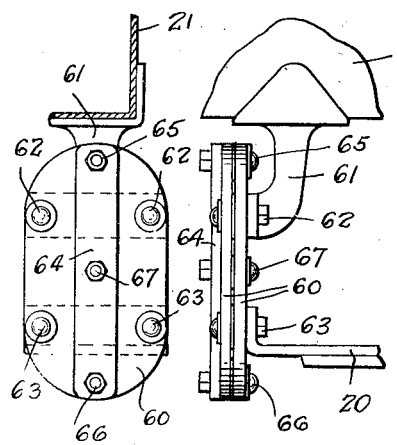
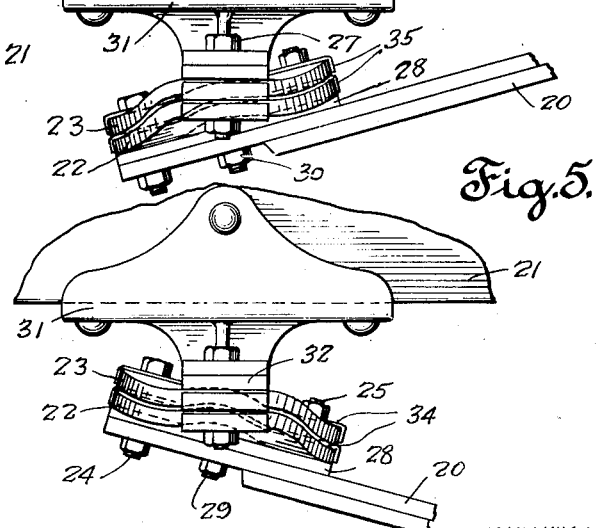
INVENTOR
Harvey W. Bell
BY E. W. Marshall
ATTORNEY

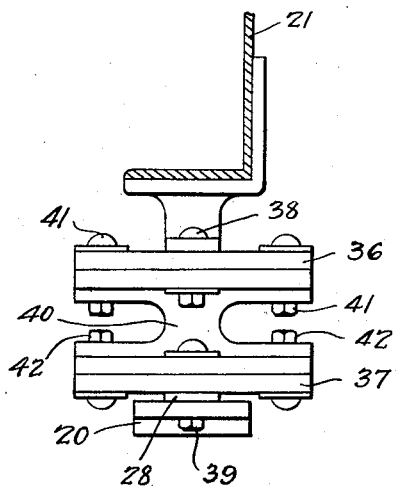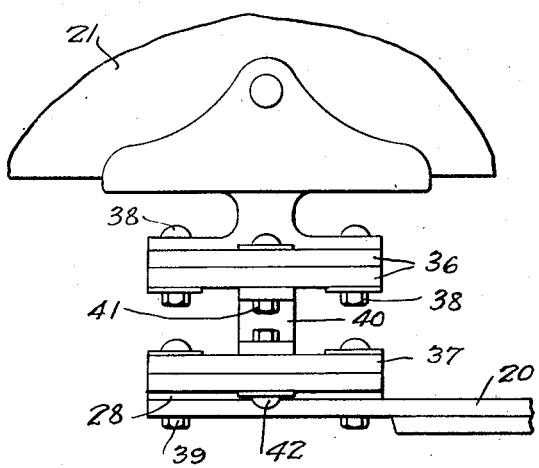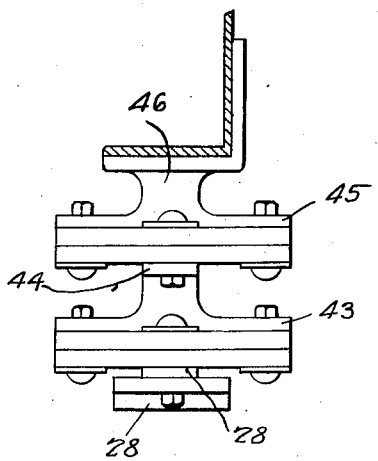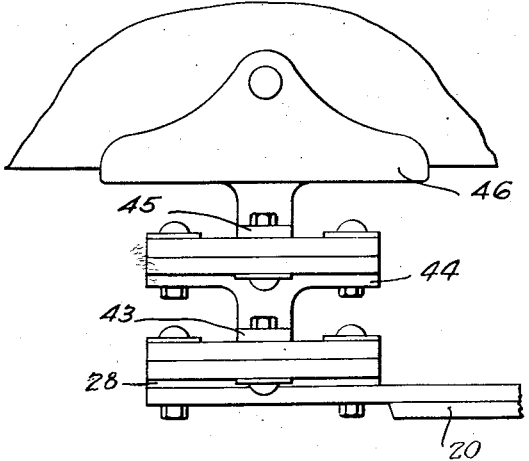

Feb. 21, 1928. 1,660,031
H. W. BELL
FLEXIBLE CONNECTION
Filed Jan. 30, 1922    3 Sheets-Sheet 3

INVENTOR
Harvey W. Bell
BY E. W. Marshall
ATTORNEY

Patented Feb. 21, 1928.

1,660,031

UNITED STATES PATENT OFFICE.

HARVEY W. BELL, OF YONKERS, NEW YORK, ASSIGNOR TO THE BELOYT CORPORATION, OF DOVER, DELAWARE, A CORPORATION OF DELAWARE.

FLEXIBLE CONNECTION.

Application filed January 30, 1922. Serial No. 532,744.

This invention relates generally to flexible connections and particularly to flexible connections between cooperating parts such as the vehicle frame and motor, vehicle frame and radiator, or the supporting springs and the body and running gear of a vehicle.

Special objects of the invention are to provide a simple, practical and efficient form of pivotal connection between such parts as the spring and body frame, or other part to which it may be attached, which will control and prevent undesirable movements without interfering with the normal free action of the spring and which will be noiseless, require no lubrication or other attention and will not impart any twisting or breaking strains to the spring.

These and other objects are attained in the structures illustrated in the accompanying drawings which exemplify but a few of the possible forms the invention may take, and wherein:

Figure 1 is an end view of the connection as constructed and applied for pivotally connecting one end of a supporting spring with the frame of a vehicle, the frame in this instance being shown in cross section.

Figure 2 is a side view with the end of the spring and the attached connection shown in section.

Figure 3 is a bottom plan view.

Figures 4 and 5 are broken side views illustrating in somewhat exaggerated form the flexure of the connection under maximum and minimum load conditions.

Figure 10:
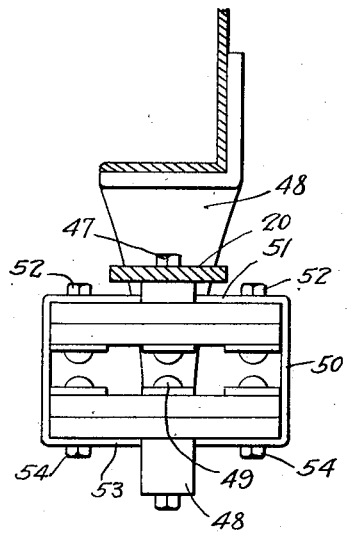
Figure 11:
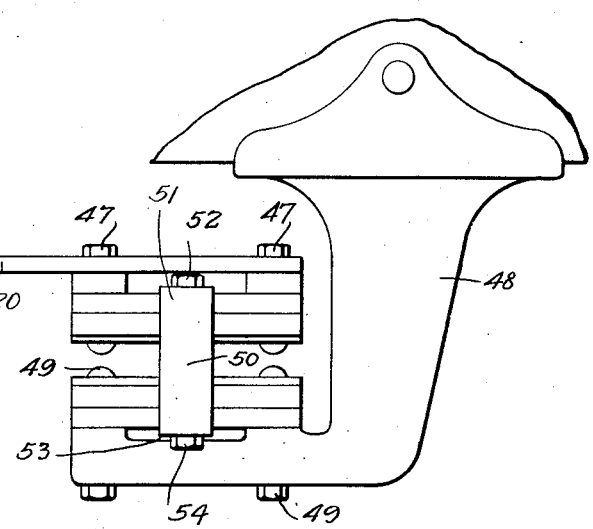
Figure 12:
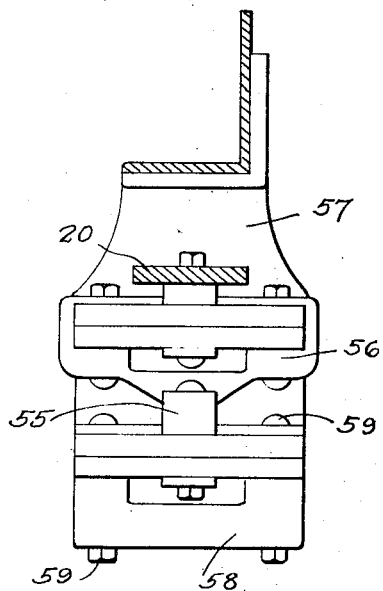
Figure 13:
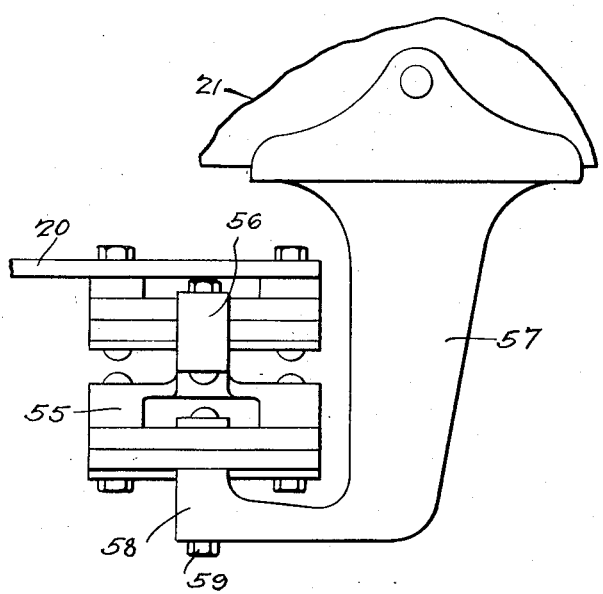

In the form herein shown, the invention is employed as a means of flexibly or hingedly connecting the end of a supporting spring 20 with the body or frame 21 of a vehicle. It should be understood, however, that the connection is equally well adapted for use in connecting other parts.

In the first form of the invention disclosed in Figures 1 to 5, the coupling consists of a pair of discs 22, 23, of flexible and preferably non-metallic material on the order of rubberized fabric or rubber impregnated canvas belting arranged in superposed relation and connected at their peripheral portions with the master leaf of a laminated spring and with the frame respectively. The connection with the spring is made by diametrically opposite bolts 24, 25 and the connection with the frame is made by diametrically opposite bolts 26, 27 disposed on a diameter at right angles to the diametrical line of the spring attaching bolts.

For convenience of attachment, the first pair of bolts 24, 25 are passed through a base plate 28 which overlies the end of the spring and is held securely thereto by the first bolt 24 which passes through both said plate and the end of the spring, and an additional short bolt 29 which extends from an intermediate portion of such base plate through the spring at a point inward from the end thereof, both such bolts having suitable nuts or other fastenings 30.

The body or frame attaching bolts 26, 27 are carried by a suitable bracket 31 fastened to the frame and provided with a transversely extending bearing 32 in the ends of which said bolts are seated and which is shown as having a curved under surface 33 forming a rocker engaging the upper face of the upper disc.

To prevent tearing or undue wear about the bolt holes I have shown the flexible discs as reinforced by washers 34, which, between the discs, also operate as spacers and which, furthermore, are shown as having angularly turned curved flanges 35 overlying the edges of the discs to confine and protect the same.

The discs, constructed of rubberized fabric, impregnated belting or the like material, are relatively stiff and non-yielding in their flat plane but are comparatively flexible and free to bend in directions transverse or at right angles to such plane. Therefore, when they are secured as disclosed at two diametrically opposite peripheral points to one of the connected members and at two other diametrically opposite peripheral points to the other of the connected members, said discs will oppose twisting or torsional strains in the flat plane of the fabric but will permit of a rocking or pivotal motion of the members relative to each other on planes connecting the bolts of each pair; or to be more exact, in the construction under consideration the spring and body have a rocking connection about the transverse bearing 32 as a pivotal center and the car body has a rocking bearing on the base plate 28.

In Figure 4 I have illustrated to a somewhat exaggerated extent how when the spring is flexed under extreme load conditions there is a relative rocking movement about the curved bearing 33, on a plane substantially at right angles to the length of the spring and how this flexing is allowed for by the reverse bending of the peripheral portions of the discs in between the points where it is fixedly held by bolts 24—25 and 26—27 respectively.

Under minimum or no-load conditions, as for instance, in the extreme rebound movement of the vehicle body as represented in Figure 5, the discs permit a pivotal motion about the transverse bearing 33 in the reverse direction, the "quadrants" of the discs at the points between the clamping bolts providing freedom sufficient for such action. Undue stretching of the fabric is thus avoided and sufficiently free pivotal motion is provided for without any actual looseness between the connected parts.

The action will be seen to be the same as that described when the body rocks sideways on the spring, the pivotal motion in such case being then along the line connecting the bolts 24, 25, or longitudinally of the spring, the intermediate or free segments of the discs in this case again bending in reverse directions at opposite sides of the pivotal plane to provide the necessary flexure.

The embodiment of the invention shown is a link or connection of compression type, designed to be used between the frames and springs of vehicles, but the invention obviously is broad enough to supply other needs, such as a connection between the vehicle frame and motor casing or radiator or other parts.

It will be noted that under load conditions that part of the disc or discs which lies directly between the crossed bearing members is in compression and operates in effect as a flexible or resilient cushion carrying the weight of the car. As the bearings simply have a rocking or rolling motion on this cushion there is no particular wearing tendency at this point, but even should wear occur here, this simply means that the thickness of the cushion is reduced and this without affecting the actual coupling between the parts, provided by the flexible quadrants between the rigidly held portions of the disc or discs. It will also be noted that in the wearing down or further compression of the cushion portion at the center of the discs, possible looseness due to stretching of the material will be automatically taken up and in a sense compensated.

When more than one disc is used and spacers are interposed between such discs, these spacers may become embedded or sunk in the material of the discs, substantially as I have illustrated so that the discs are to all effects in contact throughout substantially their entire areas, these so-called spacers then simply serving as additional or auxiliary clamping means for the individual discs. The terms "disc" and "disc-like" are used to define elements such as those shown at 22 and 60, which are substantially flat but of any desired contour, and not necessarily round or with curved corners.

This invention is an improvement over and in a sense a development of that shown in my copending applications, Serial #395,266, now Patent #1,427,185, Serial #444,321, now Patent #1,471,473, and Serial #363,189, for spring suspension, filed March 4, 1920.

What I claim is:

1. A flexible connection for cooperating members comprising comparatively narrow metallic parts disposed to cross one another, a relatively flat disc of flexible non-metallic material interposed between said parts, said parts being arranged to bear upon opposite surfaces of the disc at the point where they cross, and being connected with the disc at points spaced from said points of crossing.

2. A flexible connection for cooperating members comprising comparatively narrow metallic parts disposed to cross one another, a relatively flat disc of flexible non-metallic material interposed between said parts, said parts being arranged to bear upon opposite surfaces of the disc at the point where they cross, and being connected with the disc at points spaced from said points of crossing and from each other.

3. A flexible connection for cooperating members comprising comparatively narrow metallic parts disposed to cross one another, a relatively flat disc of flexible non-metallic material interposed between said parts, said parts being arranged to bear upon opposite surfaces of the disc at the point where they cross, in which the crossed metallic parts are secured to opposite faces of the disc at quadrangularly related points.

4. A flexible connection for the supporting members of the vehicle comprising two parts having comparatively narrow bearing elements disposed in crossed relation, a flexible disc-like connecting structure interposed between said parts, the bearing elements of the parts being arranged to bear against opposite sides of the disc-like structure, said parts being rigidly secured respectively to opposite sides of and to spaced portions of the disc-like structure.

5. A flexible connection for the supporting members of a vehicle comprising a flexible disc-like connecting structure interposed between two members having bearing elements standing in crossed relation at opposite sides of the disc-like structure and rigidly secured respectively to the members and to opposite spaced portions of the disc-like structure.

6. A pivotal connection between the spring and body of a vehicle comprising a disc-like flexible connector and means rigidly securing outer portions of the same at relatively separated points to the body and spring respectively.

7. Flexible connecting means for the supporting members of a vehicle comprising cooperating members, a disc-like flexible member and means rigidly securing outer portions of the same at quadrangularly related separated points to said connected members.

8. In combination with a vehicle body and supporting spring therefor, cooperating members connected respectively with said body and with said spring, a disc-like flexible coupling interposed between said members, said members having angularly related bearing elements extending diametrically across opposite faces of the disc-like coupling and rigidly secured near their ends to widely separated portions of the disc-like structure.

9. A pivotal connection between the supporting members of a vehicle comprising a disc interposed between the members and constructed of a material strongly resistant to flexure in the plane thereof but flexible in planes transverse thereto, bearings carried by the members at opposite sides of said disc, said bearings extending in crossing relation substantially diametrically of the disc and means for rigidly securing said cross bearings to the disc.

10. A pivotal connection between the frame and supporting spring of a vehicle comprising a flexible disc-like element interposed between said members, said members having bearings standing in crossed relation at opposite sides of said element with the material thereof in compression between the crossing portions of the bearings and carrying the load of the vehicle and means rigidly securing the end portions of said crossed bearings to relatively widely spaced apart free portions of the flexible element.

11. A pivotal connection between the supporting members of a vehicle comprising a disc interposed between the members and constructed of a material strongly resistant to flexure in the plane thereof but flexible in planes transverse thereto, bearings carried by the members and extending in crossing relation substantially diametrically of the disc and means for rigidly securing said crossed bearings to the disc.

12. A pivotal connection between the supporting members of a vehicle comprising means interposed between the members and constructed of a material strongly resistant to flexure in the plane thereof but flexible in planes transverse thereto, bearings carried by the members and extending in crossing relation substantially diametrically of the interposed means and means for rigidly securing said crossed bearings to the interposed means.

13. A pivotal connection between a vehicle frame and an element carried thereby comprising a flexible connector, means rigidly securing outer portions of said connector at relatively separated points to the frame and element, and means for transmitting loads between the frame and the element through the center portion of said connector.

14. A flexible connection between cooperating members, comprising a flexible disc-like structure rigidly secured to said cooperating members at peripheral points spaced from each other to permit of slight pivotal movements between said members and including a center portion interposed between said members to constitute a bearing surface between them.

15. A flexible connection between cooperating members, comprising a flexible connector rigidly secured to said cooperating members at points spaced from each other to permit of limited pivotal movement between said members, and including a frictional center portion interposed between said members to constitute a bearing surface between them, having the property of minimizing the tendency of slippage between said members.

16. A flexible connection between cooperating members, comprising a flexible disc rigidly secured to said cooperating members at peripheral points, the points of attachment of one member alternating with those of the other, said points being spaced from each other to provide unclamped portions of the disc, which portions will permit of limited pivotal movement between said members, said disc including a center portion interposed between said members to transmit load from one member to the other by compression of said center portion.

17. In a vehicle construction, a pivotal connection between supporting parts thereof comprising a plurality of discs constructed of flexible fabric, said discs being mounted substantially face to face, bearing members carried by said supporting parts, and arranged to bear against the outer surfaces of the center portions of the said discs to transmit the load from the one member to the other by compression of said fabric between them, and means for rigidly securing said members to said discs at alternate points adjacent the periphery of the discs, said points being spaced from each other to permit of pivotal movement between said parts.

18. A device of the kind described for flexibly connecting relatively movable members comprising a rigid bar, a disc of flexible material, means connecting the disc to the bar at one end thereof, means at the other end of the bar connecting the bar and disc and arranged also to secure the device to one of the relatively movable members, additional means for securing the bar to said relatively movable member, and means for connecting to the other relatively movable member, a portion of the disc intermediate the points at which the disc is connected to the bar.

19. A flexible coupling for connecting the master leaf of a laminated spring to a vehicle body with provision for limited relative movement between the spring and body comprising a flexible disc, a rigid base long enough when mounted on the end of the master leaf to overlap an auxiliary leaf of said spring, means connecting the opposite ends of said base to the disc, one of said connecting means being designed to form a connection between the coupling as a whole and an end of the master leaf, additional means for clamping the base to the master leaf beyond the end of the auxiliary leaf, and means for connecting the flexible disc to the vehicle body.

20. In a vehicle spring connection, a frame, a spring, a flexible disc connected to the frame, a plate member interposed between the disc and the spring, means for connecting together said plate member, said spring and said disc at a point removed from the center of said disc and means connecting said plate member and said spring at a point in line with the center of said disc.

21. In a device of the kind described, in combination, a flexible, non-metallic disc and crossed rigid members engaging opposite sides of the disc and rigidly clamped to the disc adjacent their opposite ends, one of said rigid members being convex intermediate its ends to present a curved surface for rocking engagement with the disc, and being flat at its ends to provide broad, flat surfaces to cooperate in rigidly and firmly clamping the disc.

In witness whereof, I have hereunto set my hand, this 21st day of January, 1922.

HARVEY W. BELL.